US005346737A

United States Patent [19]

Takahashi et al.

[11] Patent Number: 5,346,737

[45] Date of Patent: Sep. 13, 1994

[54] LUBRICATED POLYACETAL COMPOSITIONS

[75] Inventors: Tatsu-Hiro Takahashi, Vienna, W. Va.; Toshikazu Kobayashi, Yokohama, Japan

[73] Assignee: E. I. Du Pont de Nemours and Company, Wilmington, Del.

[21] Appl. No.: 90,292

[22] Filed: Jul. 16, 1993

Related U.S. Application Data

[63] Continuation of Ser. No. 795,951, Nov. 21, 1991, abandoned.

[51] Int. Cl.[5] .......... B29D 22/00

[52] U.S. Cl. .......... 428/36.9; 524/210; 524/228; 524/268; 524/300; 524/310; 524/314; 524/377; 524/388; 524/487; 524/517; 524/506; 524/512; 524/315; 524/502; 525/154; 525/400; 525/401

[58] Field of Search .......... 524/210, 228, 268, 300, 524/310, 314, 377, 388, 487, 517, 506, 512, 502, 315; 525/154, 400, 401; 428/36.9

[56] References Cited

U.S. PATENT DOCUMENTS

| | | | |
|---|---|---|---|
| 3,310,608 | 3/1967 | Matsubayashi et al. | 525/580 |
| 3,476,832 | 11/1969 | Pritchard | 525/127 |
| 3,795,715 | 3/1974 | Cherdron et al. | 525/164 |
| 3,808,133 | 4/1974 | Brown | 252/56 R |
| 4,041,002 | 8/1977 | Aboshi et al. | 524/296 |
| 4,051,096 | 9/1977 | Koseki et al. | 523/215 |
| 4,351,916 | 9/1982 | Kohan | 524/377 |
| 4,556,690 | 12/1985 | Nakagawa | 525/64 |
| 4,582,869 | 4/1986 | Waggoner | 524/227 |
| 4,596,847 | 6/1986 | Kasuga et al. | 524/220 |
| 4,645,785 | 2/1987 | Heinz et al. | 524/100 |
| 4,753,980 | 6/1988 | Deyrup | 524/369 |
| 4,753,980 | 6/1988 | Deyrup | 524/369 |
| 4,766,168 | 8/1988 | West | 524/377 |
| 4,814,397 | 3/1989 | Novak | 525/154 |
| 4,873,282 | 10/1989 | Yui et al. | 524/496 |
| 4,879,331 | 11/1989 | Endo et al. | 524/267 |
| 4,945,126 | 7/1990 | Crosby et al. | 524/507 |
| 4,972,014 | 11/1990 | Hayes et al. | 524/219 |
| 5,006,593 | 4/1991 | Brasure et al. | 524/520 |
| 5,011,890 | 4/1991 | Novak | 525/154 |

FOREIGN PATENT DOCUMENTS

| | | |
|---|---|---|
| 0354802 | 2/1990 | European Pat. Off. . |
| 0354802A1 | 2/1990 | European Pat. Off. . |
| 0420564A2 | 4/1991 | European Pat. Off. . |
| 49-004816 | 2/1974 | Japan . |

*Primary Examiner*—Judy M. Reddick

[57] ABSTRACT

Incorporation of at least one lubricant and an ethylene-based polymer of the formula E/X/Y wherein E is ethylene, X is methyl acrylate, butyl acrylate, or ethyl acrylate, and Y is glycidyl methacrylate, glycidyl acrylate, or glycidyl vinyl ether into polyacetal compositions results in compositions having good wear resistance and good melt processing thermal stability. The compositions are useful, for example, when molded into parts to be used in sliding applications, such as gears, cams, and conveyor chains.

10 Claims, No Drawings

LUBRICATED POLYACETAL COMPOSITIONS

This is a continuation application Ser. No. 07/795,951, filed Nov. 21, 1991, now abandoned.

BACKGROUND

This invention relates to polyacetal compositions having good wear resistance/sliding properties and also having good melt processing thermal stability. More specifically, it relates to polyacetal compositions containing at least one lubricant and at least one ethylene-based polymer.

Polyacetal resins have been widely used in various sliding applications (such as bearing materials, gears, cams, conveyor chains, etc.). It is known that various solid and liquid lubricants, such as molybdenum disulfide, graphite, polytetrafluoroethylene, paraffin oil, fatty ester, silicone etc., are added into polyacetal resins to improve friction and wear properties in such sliding applications. However, it was found that solid lubricants did not achieve desired results and that liquid lubricants (as in, for example, U.S. Pat. No. 3,808,133) caused an increase in screw retraction time due to slippage occurring during molding and extrusion processes.

To improve the performance of polyacetal in sliding applications, polyethylene and polypropylene were added to polyacetal (U.S. Pat. No. 4,945,126). However, the resultant compositions frequently suffered from peeling or delamination on the surface of molded parts and further had poor heat stability. The inclusion of lubricants and ethylene vinyl acetate copolymer into polyacetal improved friction and wear properties of polyacetal (U.S. Pat. No. 4,041,002). However, such compositions were found to have poor heat stability since the acetate groups of the ethylene vinyl acetate copolymer were found to destabilize polyacetal chains.

As such, there still exists a need to develop a polyacetal composition having not only good wear resistance properties, but also having good heat stability properties.

SUMMARY OF THE INVENTION

The compositions of the present invention consist essentially of (A) 80%-99% by weight of a polyacetal, (B) 0.5%-10% by weight of at least one lubricant, and (C) 0.5%-10% by weight of an ethylene-based random polymer of the formula E/X/Y wherein E is ethylene, X is selected from methyl acrylate, ethyl acrylate, and butyl acrylate, and Y is selected from glycidyl methacrylate, glycidyl acrylate, and glycidyl vinyl ether and further wherein E constitutes 55-99% of E/X/Y, X constitutes 0-35% of E/X/Y, and Y constitutes 1-10% of E/X/Y. The compositions of the present invention possess good wear resistance properties and have good melt processing thermal stability. The compositions of the present invention are useful in sliding applications and can be used as, for example, bearing materials, gears, cams, conveyor chains, etc.

DETAILED DESCRIPTION OF THE INVENTION

The Composition

In the present invention, there has been developed a polyacetal composition having good wear resistance and good melt processing thermal stability. Specifically, the compositions of the invention consist essentially of (A) 80%-99% by weight of a polyacetal, (B) 0.5%-10% by weight of at least one lubricant, and (C) 0.5%-10% by weight of an ethylene-based random polymer of the formula E/X/Y wherein E isethylene, X is selected from methyl acrylate, ethyl acrylate, and butyl acrylate, and Y is selected from glycidyl methacrylate, glycidyl acrylate, and glycidyl vinyl ether, with all weight percents being based upon the total of components (A), (B), and (C) only. It is preferred that the compositions of the present invention consist essentially of 84%-98.5% by weight of component (A), 0.5%-8.0% by weight of component (B), and 1.0%-8.0% by weight of component (C). Most preferably, the compositions of the present invention consist essentially of 88%-97% by weight of component (A), 1.0%-6.0% by weight of component (B), and 2.0%-6.0% by weight of component (C).

A. Component (A) - Polyacetal

The component (A) "polyacetal" includes homopolymers of formaldehyde or of cyclic oligomers of formaldehyde, the terminal groups of which are end-capped by esterification or etherification, and copolymers of formaldehyde or of cyclic oligomers of formaldehyde and other monomers that yield oxyalkylene groups with at least two adjacent carbon atoms in the main chain, the terminal groups of which copolymers can be hydroxyl terminated or can be end-capped by esterification or etherification.

The polyacetals used in the compositions of the present invention can be branched or linear and will generally have a number average molecular weight in the range of 10,000 to 100,000, preferably 20,000 to 75,000. The molecular weight can conveniently be measured by gel permeation chromatography in m-cresol at 160° C. using a Du Pont PSM bimodal column kit with nominal pore size of 60 and 1000 A. Although polyacetals having higher or lower molecular weight averages can be used, depending on the physical and processing properties desired, the polyacetal molecular weight averages mentioned above are preferred to provide optimum balance of good mixing of the various ingredients to be melt blended into the composition with the most desired combination of physical properties in the molded articles made from such compositions.

As indicated above, the polyacetal can be either a homopolymer, a copolymer, or a mixture thereof. Copolymers can contain one or more comonomers, such as those generally used in preparing polyacetal compositions. Comonomers more commonly used include alkylene oxides of 2-12 carbon atoms and their cyclic addition products with formaldehyde. The quantity of comonomer will not be more than 20 weight percent, preferably not more than 15 weight percent, and most preferably about 2 weight percent. The most preferred comonomer is ethylene oxide. Generally polyacetal homopolymer is preferred over copolymer because of its greater stiffness and strength. Preferred polyacetal homopolymers include those whose terminal hydroxyl groups have been end-capped by a chemical reaction to form ester or ether groups, preferably acetate or methoxy groups, respectively.

B. Component (B) - Lubricant

The component (B) lubricant includes solid and liquid lubricants known to be useful in polyacetal. Specific preferred examples of such lubricants include paraffin wax, polytetrafluoroethylene, fatty esters, fatty amides, silicone oil, polyethylene gylcol (preferably as described in U.S. Pat. No. 4,351,916), polytetramethylene glycol, and polypropylene glycol. Examples of useful fatty esters are given in U.S. Pat. No. 3,808,133, incorporated herein by reference, with the most preferred fatty ester being ethylene glycol distearate. The most preferred fatty amide is ethylene bis-stearamide, as described in U.S. Pat. No. 4,582,869.

C. Component (C) - Ethylene-Based Random Polymer

The component (C) is an ethylene-based random polymer of the formula E/X/Y wherein E is ethylene, X is selected from methyl acrylate, ethyl acrylate, and butyl acrylate, and Y is selected from glycidyl methacrylate, glycidyl acrylate, and glycidyl vinyl ether. Butyl acrylate is preferred for X and glycidyl methacrylate is preferred for Y. E/X/Y consists essentially of 55–99%E, 0–35%X, and 1–10%Y.

A preferred ethylene-based random polymer consists essentially of 90%–99% by weight ethylene and 1%–10% by weight glycidyl methacrylate. Preferably, this ethylene/glycidyl methacrylate ("EGMA") random polymer consists essentially of 90%–97% by weight ethylene and 3%–10% by weight glycidyl methacrylate ("GMA"). For best thermal stability results, it is recommended that the GMA content of the EGMA random polymer be more towards the higher end of the GMA range given above; however, for economic reasons, it may be more preferable for the GMA content of the EGMA random polymer to be more towards the lower end of the range given above.

Another preferred ethylene-based random polymer consists essentially of 60%–98.5% by weight ethylene, 0.5–35% by weight butyl acrylate ("BA"), and 1%–10% by weight glycidyl methacrylate ("GMA"). Preferably, this ethylene/butyl acrylate/glycidyl methacrylate ("EBAGMA") random polymer consists essentially of 55%–84% by weight ethylene, 15%–35% by weight BA, and 1%–10% by weight GMA. Most preferably, this EBAGMA random polymer consists essentially of 57.5%–74% by weight ethylene, 25%–35% by weight BA, and 1%–7.5% GMA.

The ethylene-based random polymer component can be prepared by techniques readily available to those in the art. An example of the EBAGMA random polymer is provided in U.S. Pat. No. 4,753,980. The EBAGMA random polymer is the most preferred component (C).

D. Other Ingredients

It should be understood that the compositions of the present invention can contain other ingredients, modifiers, and additives known to be useful in polyacetal compositions.

Examples of such other ingredients, modifiers, and additives include, but are not limited to, the following:

Thermal stabilizers, such as polyamides (including a nylon terpolymer of nylon 66, nylon 6/10, and nylon 6 and the polyamide stabilizer of U.S. Pat. No. 3,960,984); meltable hydroxy-containing polymers and copolymers, including ethylene vinyl alcohol copolymer and the stabilizers described in U.S. Pat. No. 4,814,397 and U.S. Pat. No. 4,766,168; non-meltable hydroxy-containing or nitrogen-containing polymers as described in U.S. Pat. No. 5,011,890 and in particular, polyacrylamide; and microcrystalline cellulose;

Antioxidants, including those described in U.S. Pat. No. 4,972,014;

Tougheners, including as polyurethanes;

Pigments and colorants;

UV stabilizers and hindered amine light stabilizers;

Nucleating agents, such as boron nitride and talc;

Co-stabilizers; and

Fillers and reinforcing agents, such as carbon black, kaolin, glass fibers, glass beads, glass flake, optical brighteners, and anti-static agents.

Preparation of the Compositions

The compositions of the present invention can be prepared by mixing the components at a temperature above the melting point of the polyacetal using any intensive mixing device conventionally used in preparing thermoplastic polyacetal compositions, such as rubber mills, internal mixers such as "Banbury" and "Brabender" mixers, single or multiblade internal mixers with a cavity heated externally or by friction. "Ko-kneaders", multibarrel mixers such as "Fartel continuous Mixers", injection molding machines, and extruders, both single screw and twin screw, both co-rotating and counter rotating, both intermeshing and non-intermeshing. These devices can be used alone or in combination with static mixers, mixing torpedoes and/or various devices to increase internal pressure and/or the intensity of mixing, such as valves, gate or screws designed for this purpose. Extruders are preferred. It is recommended that when using liquid lubricant at room temperature, the liquid lubricant be pumped into an extruder through a liquid injection line connected to the extruder. Of course, such mixing should be conducted at a temperature below which significant degradation of the polyacetal will occur.

It is noted that when adding higher amounts of lubricant to polyacetal, slippage of resin/material can occur during an injection molding process. In such a case, processing conditions can be improved by changing normal or standard processing conditions. For example, room temperature settings for the barrel near the hopper of an injection molding machine can be used or a special screw (deep channel depth, special flight shape) can be used in the injection molding machine. Alternatively, press molding could be used instead of injection molding. Further, if a high amount of a lubricant having a melting point below 100° C. is desired, and if the composition is to be injection molded, then it is recommended that the amount of ethylene-based polymer component be increased to ease injection molding conditions. For example, if 5% of a lubricant such as ethylene bis(stearamide) is added to a composition to be injection molded, then for ease of processability, it is recommended that at least 2% ethylene-based polymer be added to said composition.

Shaped articles can be made from the compositions of the present invention using any of several common methods, including compression molding, injection molding, extrusion molding, blow molding, rotational molding, melt spinning, and thermoforming. Injection molding is preferred. Examples of shaped articles include gears, cams, conveyor chains, sheet, profiles, rod stock, film, filaments, fibers, strapping, tape tubing, and pipe. Such shaped articles can be post treated by orientation, stretching, coating, annealing, painting, laminating, and plating. Such shaped articles and scrap therefrom can be ground and remolded.

Processing conditions used in the preparation of the compositions of the present invention and shaped articles made therefrom include melt temperatures of about 170°–260° C., preferably 185°–240° C., most preferably 200°-230° C. When injection molding the compositions of the present invention, the mold temperature will generally be 10°-120° C., preferably 10°-100° C., and most preferably about 50°-90° C.

EXAMPLES

In the following examples, there are shown specific embodiments of the present invention and certain comparisons with embodiments of control experiments outside the limits of the present invention. All temperatures are in degrees Celsius, unless otherwise specified. Measurements not originally in SI units have been so converted and rounded where appropriate.

The polyacetal component used in the sample compositions was as follows:

"POM A" was an acetate end-capped polyacetal homopolymer having a number average molecular weight of about 45,000.

The lubricant components used in the examples below were as follows:

"Paraffin" was a paraffin wax;

"EGDS" was a fatty ester, specifically ethylene glycol distearate;

"EBSA" was a fatty amide, specifically ethylene bis-stearamide.

The ethylene-based polymers used in the examples below were as follows:

"EGMA" was a 90/10 ethylene/glycidyl methacrylate random polymer having a melt index of 2, measured by ASTM D1238;

"EBAGMA (a)" was a 62/33/5 ethylene/butyl acrylate/glycidyl methacrylate random polymer having a melt index of 12, measured by ASTM D1238;

"EBAGMA (b)" was a 73/26/1 ethylene/butyl acrylate/glycidyl methacrylate random polymer having a melt index of 15, measured by ASTM D1238;

"EVA" was a 60/40 ethylene/vinyl acetate polymer;

"PE" was a high density polyethylene, sold commercially by Mitsubishi Kasei Company as HY40.

The composition of each sample tested is given in the Tables below. Weight percentages are based upon the total weight of the composition. All samples, unless otherwise stated, also contained 0.2% of the antioxidant triethyleneglycol bis(3-(3'-tert-butyl-4'-hydroxy-5'-methyl phenyl) proprionate. Samples 1-27 also contained 0.6% of a non-meltable polyacrylamide thermal stabilizer, as described in U.S. Pat. No. 5,011,890. Samples 28-32 also contained 0.6% of a thermal stabilizer that was a 33/23/43 terpolymer of nylon 66, nylon 6/10, and nylon 6, respectively.

Samples were prepared by mixing all components together at room temperature, feeding the resultant mixture into a hopper, and then compounding on an extruder. Samples were compounded on a 30 mm Werner & Pfleiderer twin screw extruder with barrel temperature settings of 190° C.-200° C. The temperature of the melt existing the die was about 210° C. The melt was then pelletized for sample testing.

Samples were tested for wear resistance and melt processing thermal stability, as described below.

Wear resistance was determined by measuring the "dynamic coefficient of friction" and "wear amount" of the sample via the Thrust Washer type test method (Japanese Industrial Standard (JIS) K7218A). Samples were molded as described in JIS K7218A. The dynamic coefficient of friction test was conducted at 1 kg/cm$^2$, 0.15 m/sec, 3 hours, room temperature. Wear amount (mg) was determined by measuring the total weight loss of both the upper and lower friction test parts.

Melt processing thermal stability was measured by using a thermally evolved formaldehyde (TEF) test procedure. A weighted sample of polyacetal composition was placed in a tube and the tube was fitted with a cap for introduction of nitrogen to the test sample for removal of any evolved gases from the apparatus while maintaining the sample in an oxygen-free environment. The tube that contained the sample was heated at 250° C. in a silicon oil bath. The nitrogen and any evolved gases transported thereby were bubbled through 75 ml of a 40 g/liter sodium sulfite in water solution. Any evolved formaldehyde reacts with the sodium sulfite to liberate sodium hydroxide. The sodium hydroxide was continuously neutralized with standard 0.1N HC1. The results were obtained as a chart of ml of titer versus test time. The percent evolved formaldehyde was calculated by the formula $$(V)(N)\frac{0.03 \times 100}{SW}$$

where

V=the volume of titer in milliliters

N=the normality of the titer, and

SW=the sample weight in grams.

The factor "0.03" is the milliequivalent weight of formaldehyde in g/milliequivalent. Thermal evolved formaldehyde in g/milliequivalent. Thermal evolved formaldehyde results are conveniently reported in the Tables below after thirty minutes heating ($TEF_{30}$).

Test results are provided in the Tables below.

EXAMPLES 1-14

The compositions of Examples 1-14, along with test results thereon, are provided in TABLE I, below. The compositions containing EGMA and a lubricant had better TEF results than did comparable compositions containing EVA and a lubricant.

EXAMPLES 15-27

The compositions of Examples 15-27, along with test results thereon, are provided in TABLE II, below. The compositions containing EBAGMA and a lubricant had better TEF results than did comparable compositions containing EVA and a lubricant.

EXAMPLES 28-32

The compositions of Examples 28-32, all with test results thereon, are provided in TABLE III, below. The compositions containing EBAGMA and a lubricant had better TEF results than did comparable compositions containing EVA and a lubricant.

TABLE I

| Example No. | Wt. % POM-A | Wt. % Ethylene-Based Polymer | Wt. % Lubricant | Dynamic Coefficient of Friction | Wear Amount (mg) | $TEF_{30}$ (%) |
|---|---|---|---|---|---|---|
| 1* | 99.2 | — | — | 0.45-0.50 | 20 | 0.10 |
| 2* | 97.2 | — | 2.0% Paraffin | 0.20-0.25 | 2 | 0.44 |
| 3* | 97.2 | — | 2.0% EGDS | 0.20-0.25 | 12 | 0.47 |

TABLE I-continued

| Example No. | Wt. % POM-A | Wt. % Ethylene-Based Polymer | Wt. % Lubricant | Dynamic Coefficient of Friction | Wear Amount (mg) | $TEF_{30}$ (%) |
|---|---|---|---|---|---|---|
| 4* | 96.7 | 2.5% EGMA | — | 0.30–0.35 | 1 | 0.09 |
| 5 | 95.7 | 2.5% EGMA | 2.0% Paraffin | 0.20–0.25 | <1 | 0.10 |
| 6 | 94.7 | 2.5% EGMA | 2.0% EGDS | 0.20–0.25 | <1 | 0.25 |
| 7* | 96.7 | 2.5% EVA | — | 0.25–0.30 | 1 | 0.56 |
| 8* | 94.7 | 2.5% EVA | 2.0% Paraffin | 0.20–0.25 | <1 | 0.61 |
| 9* | 94.2 | 5.0% EGMA | — | 0.30–0.35 | 1 | 0.11 |
| 10 | 92.2 | 5.0% EGMA | 2.0% Paraffin | 0.20–0.25 | <1 | 0.10 |
| 11 | 92.2 | 5.0% EGMA | 2.0% EGDS | 0.20–0.25 | <1 | 0.22 |
| 12* | 94.2 | 5.0% EVA | — | 0.25–0.30 | 1 | 0.43 |
| 13* | 92.2 | 5.0% EVA | 2.0% Paraffin | 0.20–0.25 | <1 | 0.49 |
| 14* | 92.2 | 5.0% EVA | 2.0% EGDS | 0.20–0.25 | <1 | 0.80 |

*Comparative example

TABLE II

| Example No. | Wt. % POM-A | Wt. % Ethylene-Based Polymer | Wt. % Lubricant | Dynamic Coefficient of Friction | Wear Amount (mg) | $TEF_{30}$ (%) |
|---|---|---|---|---|---|---|
| 1* | 99.2 | — | — | 0.45–0.50 | 20 | 0.10 |
| 2* | 97.2 | — | 2.0% Paraffin | 0.20–0.25 | 2 | 0.44 |
| 3* | 97.2 | — | 2.0% EGDS | 0.20–0.25 | 12 | 0.47 |
| 15* | 96.7 | 2.5% EBAGMA (a) | — | 0.25–0.30 | 1 | 0.10 |
| 16 | 94.7 | 2.5% EBAGMA (a) | 2.0% Paraffin | 0.20–0.25 | <1 | 0.11 |
| 17 | 94.7 | 2.5% EBAGMA (a) | 2.0% EGDS | 0.20–0.25 | <1 | 0.25 |
| 18 | 96.7 | 2.5% EBAGMA (b) | — | 0.25–0.30 | 1 | 0.10 |
| 19 | 94.7 | 2.5% EBAGMA (b) | 2.0% Paraffin | 0.20–0.25 | <1 | 0.10 |
| 20 | 94.7 | 2.5% EBAGMA (b) | 2.0% EGDS | 0.20–0.25 | <1 | 0.26 |
| 7* | 96.7 | 2.5% EVA | — | 0.25–0.30 | 1 | 0.56 |
| 8* | 94.7 | 2.5% EVA | 2.0% Paraffin | 0.20–0.25 | <1 | 0.61 |
| 21* | 94.2 | 5.0% EBAGMA (a) | — | 0.25–0.30 | 1 | 0.11 |
| 22 | 92.2 | 5.0% EBAGMA (a) | 2.0% Praffin | 0.20–0.25 | <1 | 0.10 |
| 23 | 92.2 | 5.0% EBAGMA (a) | 2.0% EGDS | 0.20–0.25 | <1 | 0.21 |
| 24* | 94.2 | 5.0% EBAGMA (b) | — | 0.25–0.30 | 1 | 0.11 |
| 25 | 92.2 | 5.0% EBAGMA (b) | 2.0% Paraffin | 0.20–0.25 | <1 | 0.09 |
| 26 | 92.2 | 5.0% EBAGMA (b) | 2.0% EGDS | 0.20–0.25 | <1 | 0.24 |
| 12* | 94.2 | 5.0% EVA | — | 0.25–0.30 | 1 | 0.43 |
| 13* | 92.2 | 5.0% EVA | 2.0% Paraffin | 0.20–0.25 | <1 | 0.49 |
| 14* | 92.2 | 5.0% EVA | 2.0% EGDS | 0.20–0.25 | <1 | 0.80 |
| 27* | 94.2 | 5.0% PE | — | 0.20–0.25 | 1 | 0.21 |

*Comparative example

TABLE III

| Example No. | Wt. % POM-A | Wt. % Ethylene-Based Polymer | Wt. % Lubricant | Dynamic Coefficient of Friction | Wear Amount (mg) | $TEF_{30}$ (%) |
|---|---|---|---|---|---|---|
| 28* | 99.2 | — | — | 0.45–0.50 | 28 | 0.36 |
| 29* | 94.2 | 5.0% EBAGMA (b) | — | 0.25–0.30 | 1 | 0.37 |
| 30* | 94.2 | — | 5.0% EBSA | N/A | N/A | 6.55 |
| 31 | 89.2 | 5.0% EBAGMA (b) | 5.0% EBSA | 0.20–0.25 | <1 | 1.44 |
| 32* | 89.2 | 5.0% EVA | 5.0% EBSA | 0.20–0.25 | <1 | 3.88 |

*Comparative example

We claim:

1. A composition consisting essentially of (A) 80–99 percent by weight of a polyacetal, (B) 0.5–10 percent by weight of at least one lubricant and (C) 0.5–10 percent by weight of an ethylene-based random polymer of the formula E/X/Y wherein E is ethylene, X is selected from the group consisting of methyl acrylate, butyl acrylate, and ethyl acrylate, Y is selected from the group consisting of glycidyl methacrylate, glycidyl acrylate, and glycidyl vinyl ether, and wherein E/X/Y comprises 60–98.5 percent by weight E, 0.5–35 percent by weight X and 1–10 percent by weight Y, as based upon the total weight of E, X, and Y only, and further provided that the weight percent of (A), (B), and (C) is based upon the total weight of (A), (B), and (C) only.

2. The composition of claim 1 wherein the component (A) polyacetal is a homopolymer.

3. The composition of claim 1 wherein the component (A) polyacetal is a copolymer.

4. The composition of claim 1 wherein the component (B) lubricant is selected from the group consisting of paraffin wax, polytetrafluoroethylene, fatty esters, fatty amides, silicone oil, polyethylene glycol, polytetramethylene glycol, and polypropylene glycol.

5. The composition of claim 1 wherein the component (B) lubricant is selected from paraffin wax, ethylene glycol distearate, ethylene bis(stearamide), polytetramethylene glycol, and polyethylene glycol.

6. The composition of claim 1 wherein the component (C) is an ethylene/butyl acrylate/glycidyl methacrylate random polymer.

7. The composition of claim 1 wherein the component (C) is an ethylene/glycidyl methacrylate random polymer.

8. The composition of claim 1 further containing at least one of thermal stabilizers, antioxidants, tougheners, colorants, UV stabilizers, nucleating agents, fillers, and reinforcing agents.

9. Shaped articles made from the composition of claim 1.

10. A shaped article of claim 9 selected from the group consisting of gears, cams, conveyor chains, sheet, profiles, rod stock, film, filaments, fibers, strapping, tape, tubing, and pipe.

* * * * *